US007121010B2

(12) United States Patent
Marshall et al.

(10) Patent No.: US 7,121,010 B2
(45) Date of Patent: Oct. 17, 2006

(54) LINE GENERATING DEVICE

(75) Inventors: James D. Marshall, Mallorytown (CA); Oleksiy P. Sergyeyenko, Brockville (CA); Stefano F. DeCecco, Ottawa (CA); Ted A. Kimball, Oxford Station (CA); Michael A. Milligan, Gananoque (CA); David M. Shaver, Brockville (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/841,749

(22) Filed: May 7, 2004

(65) Prior Publication Data
US 2005/0246912 A1    Nov. 10, 2005

(51) Int. Cl.
*G01C 15/00*    (2006.01)
(52) U.S. Cl. .................... 33/286; 33/227; 33/290; 33/DIG. 21
(58) Field of Classification Search .............. 33/227, 33/290, 285, 281, 282, 275 R, 286, DIG. 21; 356/606; 362/259
See application file for complete search history.

(56) References Cited
U.S. PATENT DOCUMENTS

| | | | | |
|---|---|---|---|---|
| 5,111,369 A | * | 5/1992 | Shirai et al. .................. 33/379 |
| 5,208,438 A | * | 5/1993 | Underberg ............. 219/121.78 |
| 5,243,398 A | * | 9/1993 | Nielsen ....................... 33/290 |
| 5,400,514 A | * | 3/1995 | Imbrie et al. ................ 33/286 |
| 5,539,990 A | * | 7/1996 | Le ............................... 33/283 |
| 5,752,321 A | * | 5/1998 | Schmitt et al. ............... 33/288 |
| 5,819,424 A | * | 10/1998 | Ohtomo et al. .............. 33/286 |
| 5,864,956 A | * | 2/1999 | Dong ........................... 33/227 |
| 5,872,657 A | * | 2/1999 | Rando ......................... 33/286 |
| 6,087,645 A | * | 7/2000 | Kitajima et al. ....... 33/DIG. 21 |
| 6,163,969 A | * | 12/2000 | Jan et al. ..................... 33/286 |
| 6,707,613 B1 | * | 3/2004 | Fujimoto et al. ........... 359/622 |
| 2004/0123472 A1 | * | 7/2004 | Shuming ..................... 33/286 |

* cited by examiner

*Primary Examiner*—Diego Gutierrez
*Assistant Examiner*—Travis Reis
(74) *Attorney, Agent, or Firm*—Wesley W. Muller; Jon Yun; Bruce S. Shapiro

(57) ABSTRACT

A line generating device may include a housing having a bottom surface, a top surface, a front surface connecting the top and bottom surfaces, a rear surface connecting the top and bottom surfaces, and a side surface connecting the top and bottom surfaces, a support assembly mounted within the housing. In addition, the device may include a light source mounted on the support assembly, and a lens for receiving light and projecting the light in the shape of a fan within a plane. The light plane exits through the front surface. The device is disposable on a reference surface on the bottom, rear and side surfaces.

16 Claims, 11 Drawing Sheets

LINE GENERATING DEVICE

FIELD OF THE INVENTION

The present invention generally relates to line generating devices and more specifically to laser line generating devices.

BACKGROUND OF THE INVENTION

In the construction industry, it is well known to use laser levels for marking reference lines to be used in the layout of different features in a room or structure. Most of these laser levels are expensive due to the optics and electronics involved therein.

Less expensive laser levels that generate a laser line have recently entered the market. However, they typically have limited uses. Accordingly, it is an object of the invention to provide a line generating device that can be used in multiple situations.

SUMMARY OF THE INVENTION

In accordance with the present invention, an improved line generating device is employed. The line generating device may include a housing having a bottom surface, a top surface, a front surface connecting the top and bottom surfaces, a rear surface connecting the top and bottom surfaces, and a side surface connecting the top and bottom surfaces, a support assembly mounted within the housing, a light source mounted on the support assembly, and a lens mounted on at least one of the support assembly and the light source, the lens receiving light and projecting the light in the shape of a fan within a plane, said light exiting through the front surface, wherein the device is disposable on a reference surface on the bottom, rear and side surfaces.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 10 illustrates the adjustment axes for adjusting a level vial in the line generating device, wherein

FIG. 11 illustrates the means for adjusting the level line, wherein

FIG. 12 illustrates several lenses for generating a laser line with at least one bright spot, wherein

FIG. 16 illustrates a hanging assembly, wherein

FIG. 17 illustrates a pin assembly, wherein

DETAILED DESCRIPTION

Figure 1:
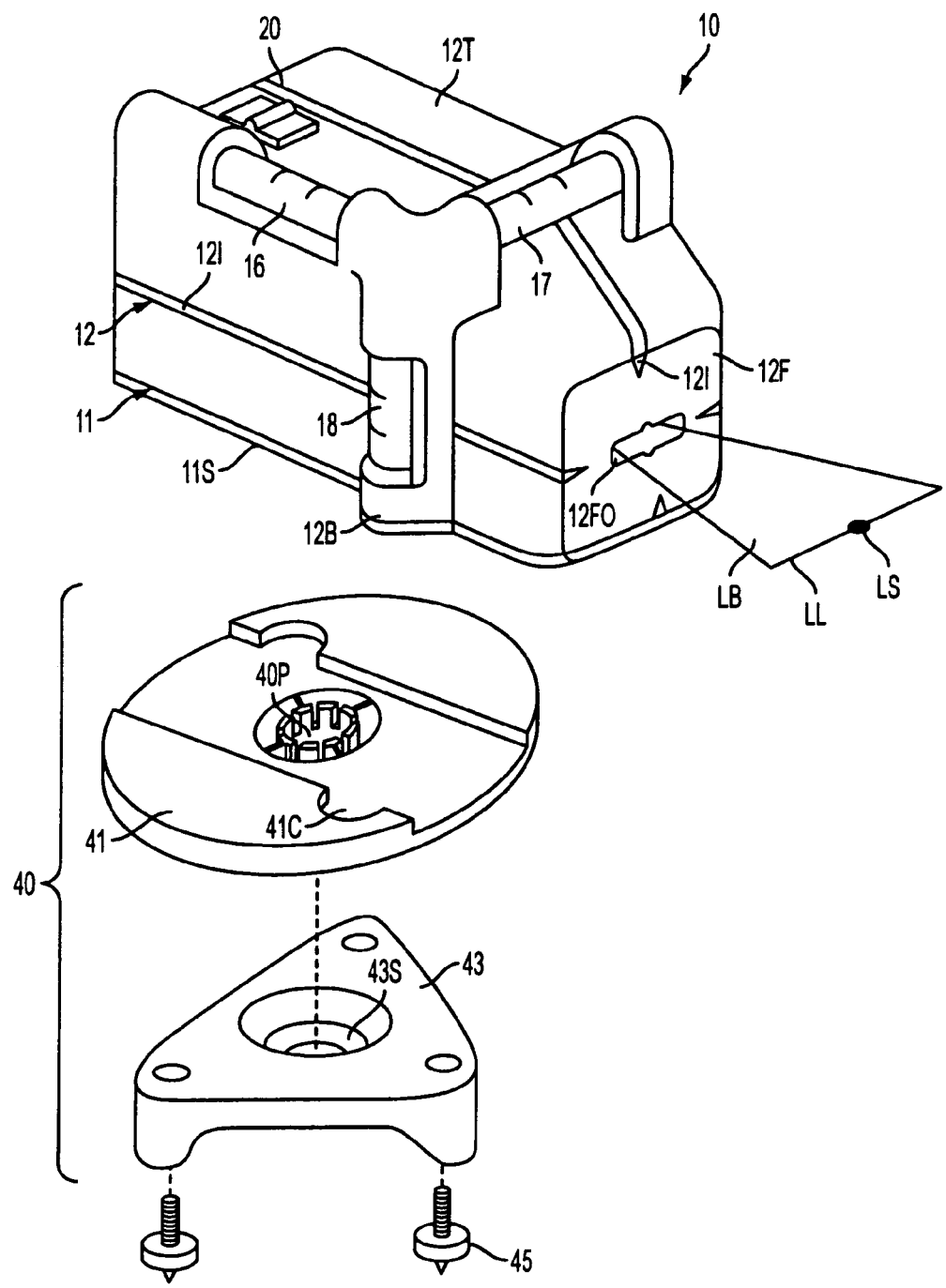
FIG. 1 is a left-side front perspective view of a line generating device constructed in accordance with the teachings of the present invention.
Figure 2:
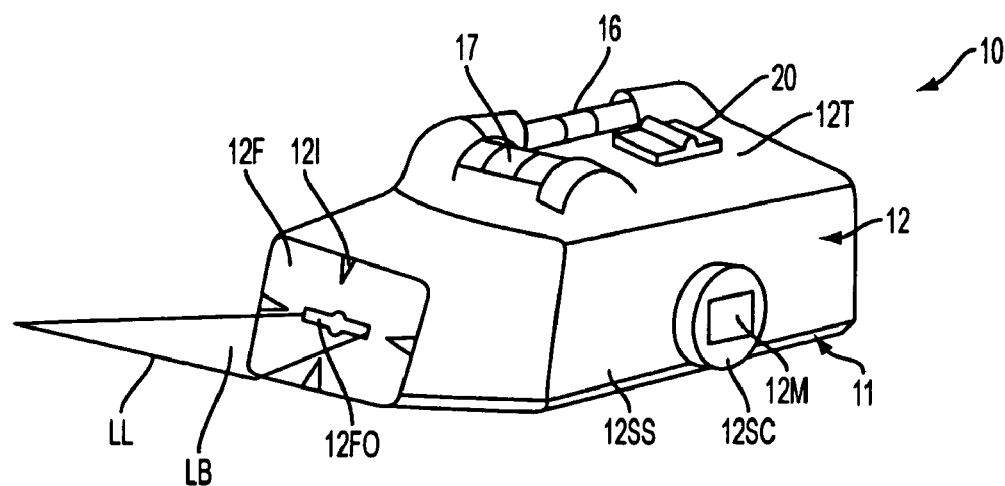
FIG. 2 is a right-side front perspective view of the line-generating device of FIG. 1.

With reference to FIGS. 1–6, a line-generating device constructed in accordance with the teachings of the present invention is generally indicated by reference numeral 10. Line generating device 10 may comprise a base assembly 11, a housing assembly 12, a support assembly 13 disposed on at least one of the base assembly 11 and housing assembly 12, a laser barrel assembly 14 disposed on the support assembly 13, a lens assembly 15 mounted onto the laser barrel assembly 14, level vials 16, 17, 18 mounted on at least one of the base assembly 11, housing assembly 12 and support assembly 13, a printed circuit board (not shown) with a switch 20 mounted thereon, a battery (not shown) mounted on at least one of the base assembly 11, housing assembly 12 and support assembly 13. Persons skilled in the art are referred to U.S. Application No. 20020178596 and Ser. No. 10/822,626 (filed Apr. 12, 2004), both of which are wholly incorporated by reference, for further information on the elements of the line generating device 10.

Base assembly 11 is preferably made of metal, such as aluminum. Base assembly 11 preferably has a substantially horizontal planar support 11S. Planar support 11S is preferably machined.

Support assembly 13 is preferably disposed or mounted on base assembly 11. Support assembly 13 preferably supports laser barrel assembly 14, lens assembly 15 and vials 16, 17, 18.

Housing assembly 12 may be mounted onto base assembly 11 to substantially enclose support assembly 13, laser barrel assembly 14, lens assembly 15 and vials 16, 17, 18. In particular, screws 12S may extend through base assembly 11 and threadingly engage housing assembly 12.

Housing assembly 12 may have a front surface 12F, a rear surface 12R, a top surface 12T, and a side surface 12SS. Front surface 12F may have an opening 12FO to allow a laser beam to exit through housing assembly 12. Preferably, side surface 12SS has a protrusion 12SC, which may be a cylinder. Protrusion 12SC may also have a magnet 12M disposed therein. Rear surface 12R may have a protrusion 12RC, which may be a cylinder.

As will be discussed below, the line generating device 10 generates a planar laser beam LB, which generates a laser line LL on a reference surface, such as a wall, floor, etc. As shown in FIG. 1, when the line generating device 10 is disposed on surface 11S of base assembly 11 and on a substantially horizontal reference surface, e.g., a floor, the line generating device 10 will generate a substantially horizontal laser beam LB. Such laser beam LB will create a substantially horizontal laser line LL on a second reference surface having a vertical component, e.g., such as a wall, whether the wall is vertical or inclined relative to the substantially horizontal reference surface.

In such orientation, it is preferable that level vial 17 indicate that the laser line LL is substantially level, i.e., horizontal. Persons skilled in the art will recognize that laser beam LB may not necessarily be substantially level when laser line LL is level. This is because laser beam LB may be inclined, for example, when line generating device 10 is disposed at a location higher than laser line LL.

Persons skilled in the art will also recognize that level vial 16 can be calibrated so that it can indicate when line generating device 10 is substantially level. Accordingly, a user can use both level vials 16, 17 to confirm that the laser line LL, the laser beam LB and line generating device 10 are substantially level.

As shown in FIGS. 1 and 3–5, and as will be further discussed below, the line generating device 10 generates a laser beam LB which creates a laser line LL. It is also preferable that the laser beam LB create a bright spot LS on laser line LL. Preferably, the spot LS will be at the halfway point of laser line LL. Spot LS may be disposed on axis X, which may extend through the center of protrusion 12RC. Accordingly, when the line generating device 10 is in the orientation of FIGS. 1 and 4, a user can use both level vials 16, 17 to confirm that the spot LS is within a horizontal plane which includes line generating device 10.

As will be further detailed below, the line generating device 10 may be disposed on an adjustable table assembly 40. Such table assembly 40 can be adjusted by the user to adjust the orientation of the line generating device 10 to ensure that laser line LL is substantially level. Such table assembly 40 may have an opening 40P for receiving protrusions 12SC and/or 12RC.

Figure 3:
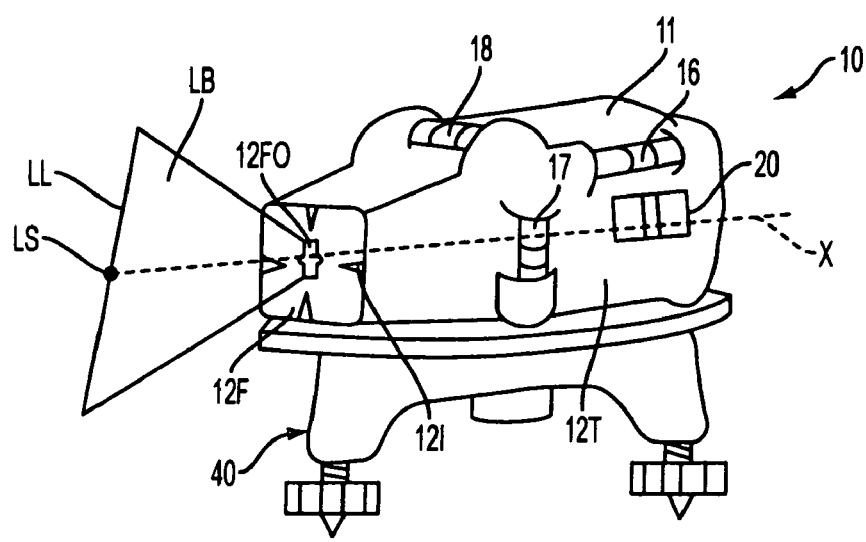
FIG. 3 is a right-side front perspective view of the line-generating device of FIG. 1 disposed on its side.
Figure 4:
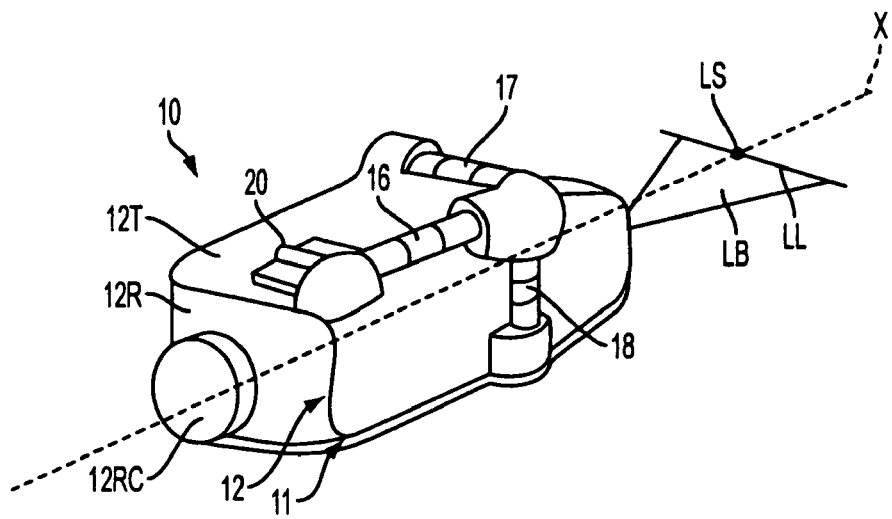
FIG. 4 is a right-side rear perspective view of the line-generating device of FIG. 1.

As shown in FIG. 3, the line generating device 10 may be disposed on its side surface 12S by inserting protrusion 12SC into opening 40P. When the line generating device 10 and table assembly 40 are disposed on a substantially horizontal reference surface, e.g., a floor, the line generating device 10 will generate a substantially vertical laser beam LB. Such laser beam LB will create a substantially vertical laser line LL on a second reference surface having a vertical component, e.g., such as a wall, whether the wall is vertical or inclined relative to the substantially horizontal reference surface. In addition, such laser beam LB will generate a laser line on the substantially horizontal reference surface.

In such orientation, it is preferable that level vial 18 indicate that the laser line LL is substantially plumb, i.e., vertical.

Persons skilled in the art will recognize that level vial 16 can be calibrated so that it can indicate when line generating device 10 is substantially level. Accordingly, a user can use both level vials 16, 18 to confirm that the spot LS is within a horizontal plane which includes line generating device 10.

Figure 5:
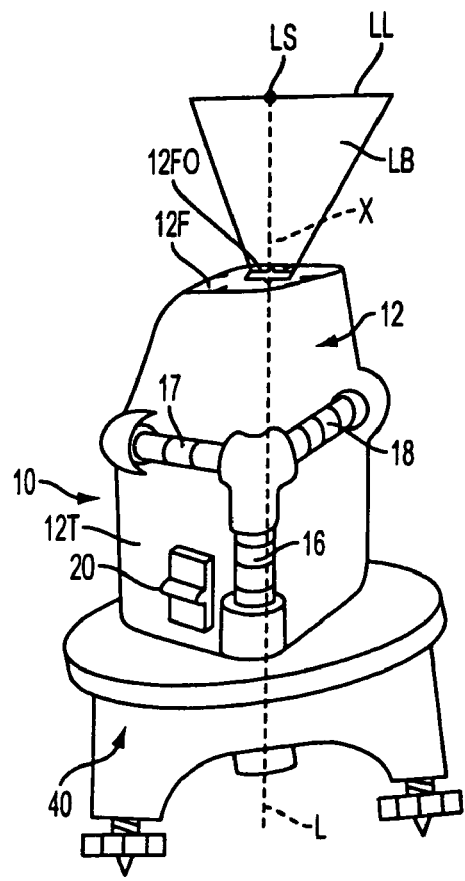
FIG. 5 is a perspective view of the line-generating device of FIG. 1 disposed on its rear.
Figure 6:
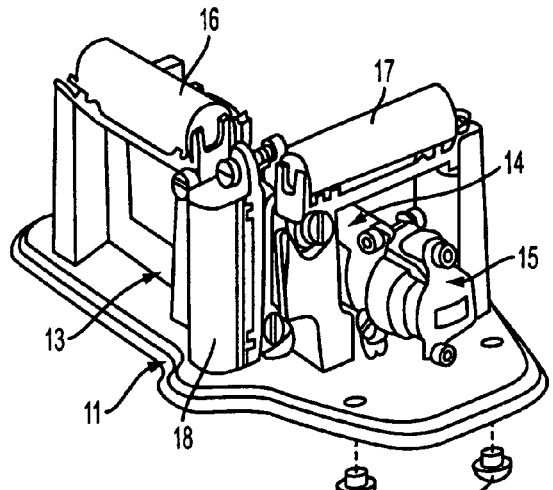
FIG. 6 is a perspective view of a laser support assembly according to the invention.
Figure 7:
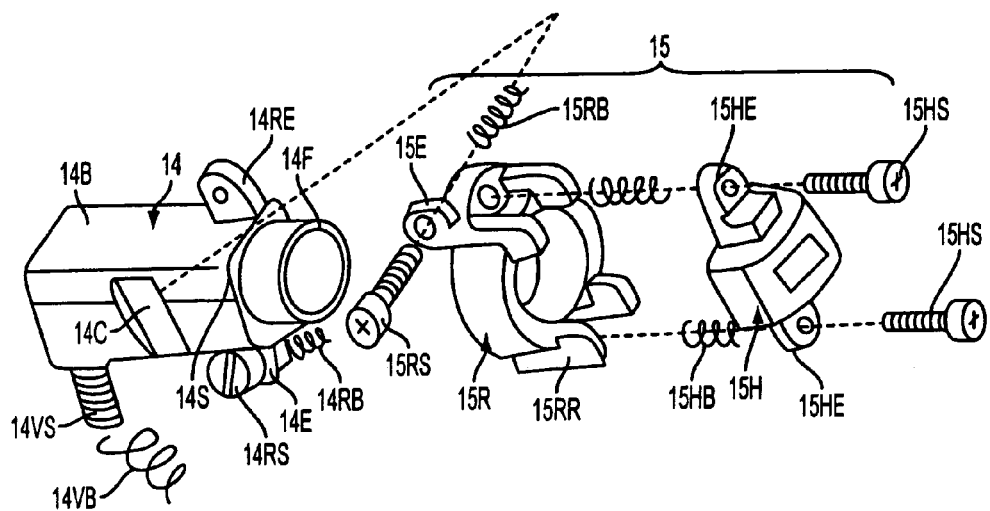
FIG. 7 is an exploded perspective view of a laser barrel assembly according to the invention.
Figure 8:
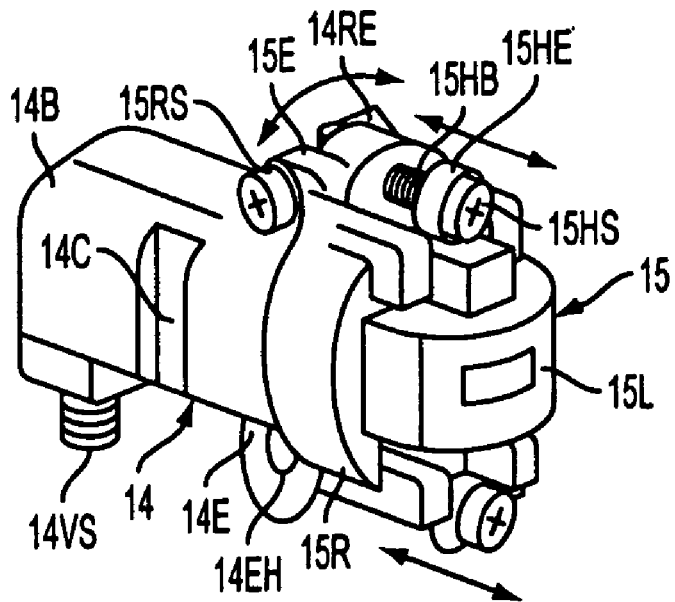
FIG. 8 is an assembled perspective view of the laser barrel assembly of FIG. 7.
Figure 9:
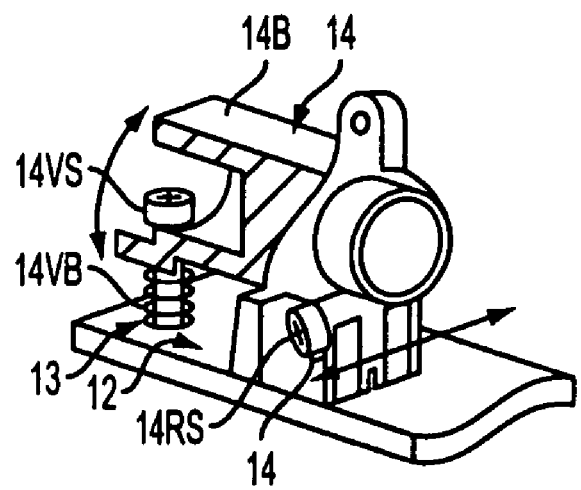
FIG. 9 is a partial cross-section of the laser barrel assembly of FIG. 7.

As shown in FIG. 5, the line generating device 10 may be disposed on its rear surface 12R by inserting protrusion 12RC into opening 40P. When the line generating device 10 and table assembly 40 are disposed on a substantially horizontal reference surface, e.g., a floor, the line generating device 10 will generate a substantially vertical laser beam LB. Such laser beam LB will create a laser line LL on a second reference surface above the first reference surface, e.g., such as a ceiling or false ceiling.

In such orientation, it is preferable that level vials 17, 18 indicate that the line generating device 10 substantially plumb, i.e., vertical. When device 10 is substantially plumb, spot LS will be aligned with a point L disposed underneath device 10. In such manner, a user can for example use line generating device to project unto a ceiling a spot that is substantially vertically aligned to a point on a floor.

Referring to FIG. 1, housing assembly 12 may have indicia 121 which are aligned to the laser beam LB and spot LS so that the user can know how laser beam LB and spot LS is aligned to the housing assembly 12.

Figure 12A:
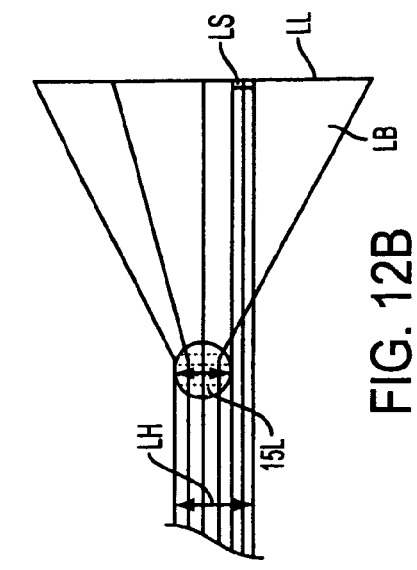
FIGS. 12A–12G are the first, second, third, fourth, fifth, sixth and seventh embodiments of the invention.

As mentioned above, laser barrel assembly 14 may be disposed on support assembly 13. Referring to FIGS. 6–9, laser barrel assembly 14 has a body 14B, which may carry laser diode 14D (see FIG. 12A) and collimating lens 14L (see FIG. 12A).

Body 14B may have a screw 14VS extending through body 14B and threadingly engaging support assembly 13. A spring 14VB may be disposed between support assembly 13 and body 14B. Preferably, spring 14VB is disposed around screw 14VS.

Body 14B may have an ear 14E with a hole 14EH extending therethrough. A screw 14RS may extend through hole 14 EH and threadingly engage support assembly 13. The longitudinal axis of screw 14RS is preferably substantially perpendicular to the longitudinal axis of screw 14VS. A spring 14RB may be disposed between support assembly 13 and ear 14E. Preferably, spring 14RB is disposed around screw 14RS.

As mentioned above, lens assembly 15 may be rotationally attached to laser barrel assembly 14. In particular, a lens 15L (see FIG. 12) may be disposed in (preferably glued to) a lens holder assembly 15H. Lens holder assembly 15 may have two ears 15HE with holes therethrough. Preferably one ear 15HE is disposed at the top of lens holder assembly 15H, whereas the other ear 15HE is disposed at the bottom of lens holder assembly 15H.

Lens holder assembly 15H may be nested within lens barrel assembly 1 SR. In particular, two screws 15HS may extend through ears 15HE and threadingly engage lens barrel assembly 15R. Springs 15HB may be disposed between lens barrel assembly 15R and ears 15HE. Preferably, springs 15HB are disposed around screws 15HS. Lens barrel assembly 15R may have ribs 15RR on both sides of ears 15HE to prevent rotation of the lens holder assembly 15H.

Lens barrel assembly 15R may be rotatably disposed on a flange 14F of body 14B. Body 14B may have a shoulder 14S to limit movement of lens barrel assembly 15R along flange 14F.

Lens barrel assembly 15R may have an ear 15E having a hole therethough. A screw 15RS may extend through the ear 15E and threadingly engage an ear 14RE on body 14B. A spring 15RB may be disposed between ears 14RE and 15E. Preferably, spring 15RB is disposed around screw 15RS.

With such arrangement, the lens holder assembly 15H can be adjusted to tilt lens 15L for crowning by adjusting each screw 15HS. Springs 15HB bias lens holder assembly 15H away from lens barrel assembly 15R and into the heads of screws 15HS to maintain lens holder assembly 15H in the desired position. The screws 15HS may be fixed by a locking compound, such as Loc-Tite.

The lens barrel assembly 15R is preferably rotationally connected to body 14B of laser barrel assembly 14. The generated laser beam LB can be calibrated so that the resulting laser line LL is level (and/or parallel to surface 11S) by rotating lens barrel assembly 15R relative to body 14B. This can be accomplished by rotating screw 15RS. Spring 15RB biases lens barrel assembly 15R away from body 14B and into the head of screw 15RS to maintain lens barrel assembly 15R in the desired position. The screw 15RS may be fixed by a locking compound, such as Loc-Tite.

The laser barrel assembly 14 is preferably adjustable along two axes relative to support assembly 13. First, the generated laser beam LB can be calibrated so that it is pararllel to surface 11S by rotating body 14B relative to support assembly 13 about a substantially horizontal axis. This can be accomplished by rotating screw 14VS. Persons skilled in the art will recognize that, when screw 14VS is rotated, body 14B will rotate about the longitudinal axis of screw 14RB. Spring 14VB biases body 14B away from support assembly 13 and into the head of screw 14VS to maintain body 14B in the desired position. The screw 14VS may be fixed by a locking compound, such as Loc-Tite.

The laser barrel assembly 14 may also be adjusted sideways so that the spot LS is aligned to axis X. This can be accomplished by rotating screw 14RS. Persons skilled in the art will recognize that, when screw 14RS is rotated, body 14B will rotate about the longitudinal axis of screw 14VB. Spring 14RB biases body 14B away from support assembly 13 and into the head of screw 14RS to maintain body 14B in the desired position. The screw 14RS may be fixed by a locking compound, such as Loc-Tite.

Persons skilled in the art may recognize that body 14B may have clearances or cut-outs, such as channel 14C, to increase the adjustment range of body 14B relative to support assembly 13.

Figure 10A:
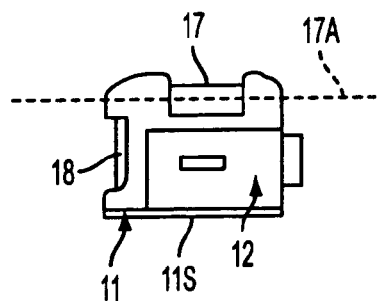
FIGS. 10A–10B are front and top plan views of the line generating device, respectively.
Figure 10B:
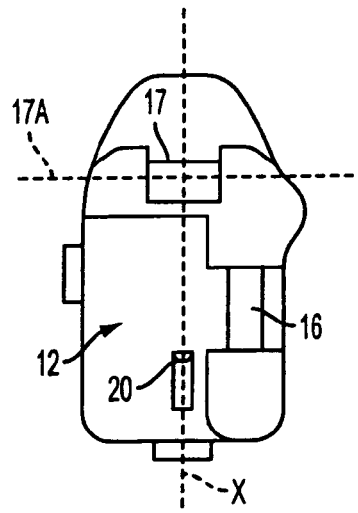

Because of the multiple orientations that line generating device 10 can be placed, it is preferable to provide a means for adjusting the level vials 16, 17, 18 along several axes. For example, referring to FIG. 10A, level vial 17 needs to be adjustable so that the vertical component of its longitudinal axis 17A is zero, i.e., the longitudinal axis 17A is substantially parallel to surface 11S. Furthermore, level vial 17 needs to be adjustable so that the longitudinal axis 17A is substantially perpendicular to axis X, as shown in FIG. 10B.

Figure 11A:
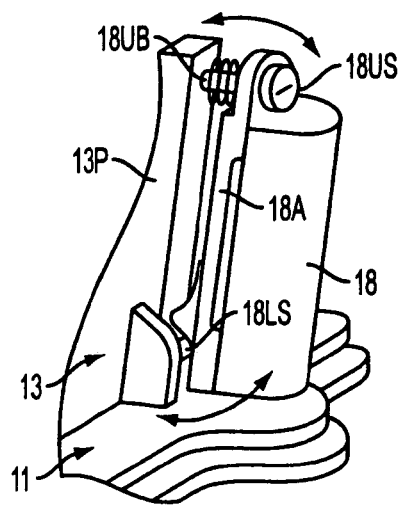
FIGS. 11A–11B show the adjustment assembly in assembled and exploded views, respectively.
Figure 11B:
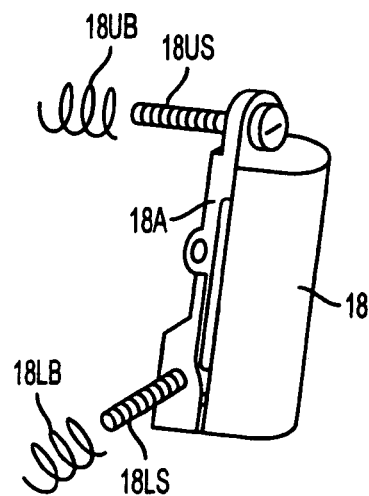

Referring to FIG. 11, support assembly 13 has a post 13P. Level vial 18 is disposed on a vial holder 18A. A first screw 18US preferably extends through a hole in vial holder 18A and is threadingly engaged to post 13P. A spring 18UB may be disposed between vial holder 18A and post 13P. Preferably, spring 18UB is disposed around screw 18US.

A second screw 18LS preferably extends through a hole in vial holder 18A and is threadingly engaged to post 13P. The longitudinal axis of second screw 18LS is preferably substantially perpendicular to the longitudinal axis of first screw 18US. A spring 18LB may be disposed between vial holder 18A and post 13P. Preferably, spring 18LB is disposed around screw 18LS.

In order to adjust level vial 18 about the first axis, screw 18US is rotated. Persons skilled in the art will recognize that, when screw 18US is rotated, holder 18A will rotate about the longitudinal axis of screw 18LS. Spring 18UB biases holder 18A away from post 13P and into the head of screw 18US to maintain holder 18A in the desired position. The screw 18US may be fixed by a locking compound, such as Loc-Tite.

To adjust level vial 18 about the second axis, screw 18LS is rotated. Persons skilled in the art will recognize that, when screw 18LS is rotated, holder 18A will rotate about the longitudinal axis of screw 18US. Spring 18LB biases holder 18A away from post 13P and into the head of screw 18LS to maintain holder 18A in the desired position. The screw 18LS may be fixed by a locking compound, such as Loc-Tite.

Persons skilled in the art will recognize that level vials 16, 17 can be provided on assemblies similar to that used with level vial 18 and adjusted accordingly.

FIG. 12 illustrates several lenses 15L to generate laser beam LB, laser line LL and spot LS. Referring to FIG. 12A, the laser diode 14D with or without a collimating lens 14L generate a laser beam having a width LH. Lens 15L is substantially cylindrical and having a diameter which is smaller than width LH. Accordingly, part of the beam goes through lens 15L, generating laser beam LB and laser line LL. Two other parts of the beam bypass, i.e., do not go through, lens 15L. These parts generate two bright spots LS.

Figure 12B:
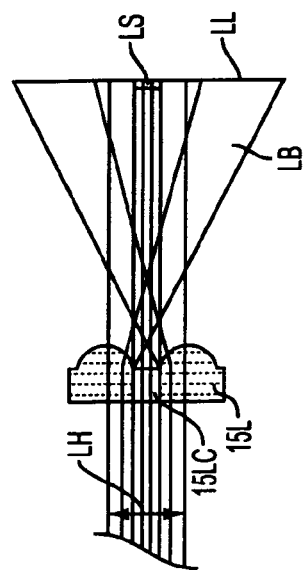

FIG. 12B illustrates another embodiment of lens 15L, where like numerals refer to like parts, and all the teachings from the previous embodiments are incorporated herein. As before, lens 15L is substantially cylindrical and has a diameter which is smaller than width LH. Accordingly, part of the beam goes through lens 15L, generating laser beam LB and laser line LL. Another part of the beam bypasses, i.e., does not go through, lens 15L. This part generates one bright spot LS.

Figure 12C:
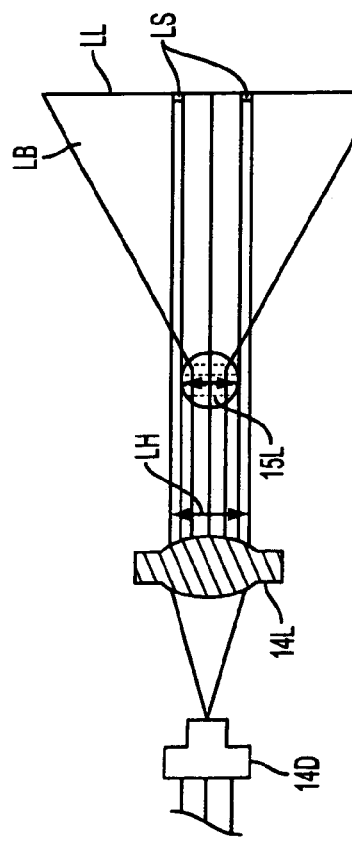

FIG. 12C illustrates a further embodiment of lens 15L, where like numerals refer to like parts, and all the teachings from the previous embodiments are incorporated herein. Unlike before, lens 15L has a width that is preferably larger than width LH. Lens 15L may have a rectangular cross-section with two half-cylinders 15LHC disposed thereon. The half-cylinders 15LHC are preferably separated at portion 15LS. Each half-cylinder 15LHC may have a radius which is smaller than width LH. Accordingly, two parts of the beam goes through half-cylinders 15LHC generating laser beam LB and laser line LL. Another part of the beam goes through portion 15LS. Because such part is preferably not refracted, it goes straight through lens 15L. This part generates one bright spot LS.

Figure 12D:
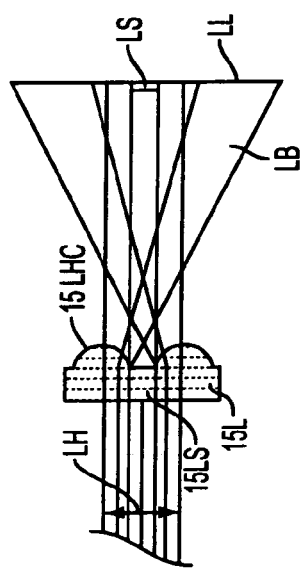

FIG. 12D illustrates another embodiment of lens 15L, where like numerals refer to like parts, and all the teachings from the previous embodiments are incorporated herein. As before, lens 15L has a width that is preferably larger than width LH. Lens 15L may have a rectangular cross-section with two half-cylinders 15LHC disposed thereon. Unlike before, the half-cylinders 15LHC are preferably separated by a channel 15LC which extends through lens 15L. Accordingly, each half-cylinder 15LHC may have a radius which is smaller than width LH. With such arrangement, two parts of the beam goes through half-cylinders 15LHC generating laser beam LB and laser line LL. Another part of the beam goes through lens 15L via channel 15LC. This part generates one bright spot LS.

Figure 12E:
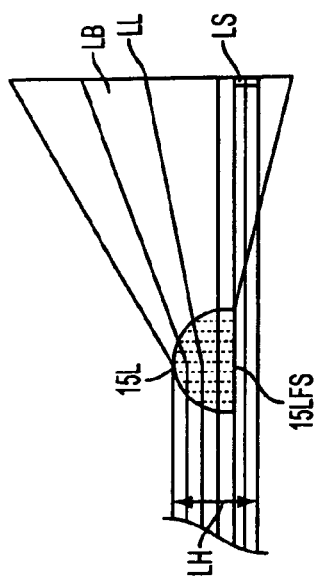

FIG. 12E illustrates yet another embodiment of lens 15L, where like numerals refer to like parts, and all the teachings from the previous embodiments are incorporated herein. As before, lens 15L has a width that is preferably larger than width LH and preferably has a channel 15LC which extends through lens 15L. Unlike before, lens 15L may have a circular cross-section. Accordingly, part of the beam goes through lens 15L, generating laser beam LB and laser line LL. Another part of the beam goes through lens 15L via channel 15LC. This part generates one bright spot LS.

Figure 12F:
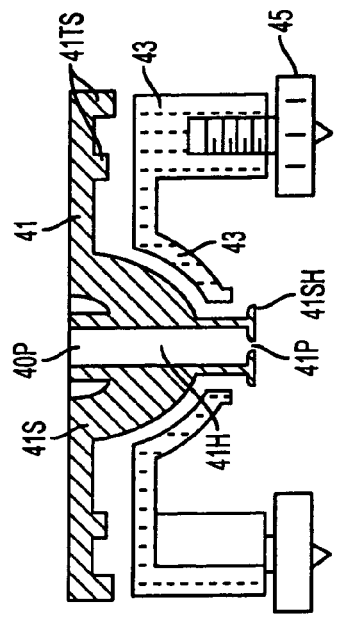

FIG. 12F illustrates another embodiment of lens 15L, where like numerals refer to like parts, and all the teachings from the previous embodiments are incorporated herein. Lens 15L has a semi-circular cross-section, with a flat surface 15LFS being substantially parallel to the laser beam. Accordingly, part of the beam goes through lens 15L, generating laser beam LB and laser line LL. Another part of the beam bypasses, i.e., does not go through, lens 15L. This part generates one bright spot LS.

Figure 12G:
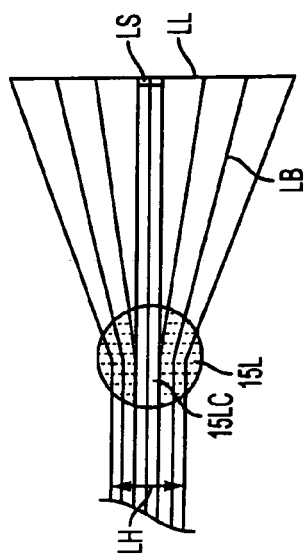

FIG. 12G illustrates another embodiment of lens 15L, where like numerals refer to like parts, and all the teachings from the previous embodiments are incorporated herein. Lens 15L has a semi-circular cross-section, with flat surface 15LFS being inclined relative to the laser beam. Accordingly, part of the beam goes through lens 15L, generating laser beam LB and laser line LL. Another part of the beam bypasses, i.e., does not go through, lens 15L. This part generates one bright spot LS.

Figure 13:
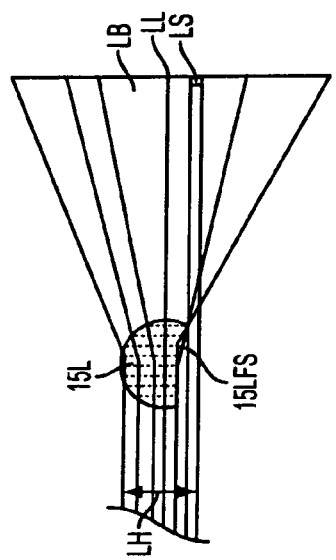
FIG. 13 is a cross-section of the table assembly of FIG. 1, shown along a center plane thereof.

Referring to FIGS. 1 and 13, and as discussed above, line generating device 10 may be disposed on table assembly 40. Preferably, table assembly 40 has a base 43, a deck 41 pivotably connected to base 43, and feet 45 threadingly engaged to base 43. Accordingly, a user can adjust the table assembly 40 (and thus line generating device 10) by moving deck 41 and/or rotating each foot 45.

Deck 41 preferably has opening 40P which receives protrusions 12RC, 12SC of line generating device. In addition, deck 41 may have a spherical portion 41S which mates with spherical cavity 43S of base 43 to allow rotation of deck 41 relative to base 43 along many different axes. Part of portion 41S may extend through base 43 and terminate in snap hooks 41SH to maintain the deck 41 connected to base 43. It is also preferable to provide deck 41 with a bore 41H therethrough, possibly with a peep hole 41P near the snap hooks 41SH. In this manner, the user can look through bore 41H and peep hole 41P to locate a point L (see FIG. 5). The user can then project a spot on a ceiling right above point L, as discussed previously.

Persons skilled in the art will recognize that it is preferable to provide enough friction between the spherical portion 41S and spherical cavity 43S to maintain the deck 41 in a desired position when line generating device 10 is provided thereon.

It may also be preferable to provide deck 41 with a feature 41C which receives a bump 12B of line generating device 10. Accordingly, when the bump 12B is aligned with feature 41C, the user can rotate both the line generating device 10 and deck 41 while touching only line generating device 10.

Persons skilled in the art will recognize that deck 41 may have stops 41TS provided thereunder to limit the adjustment range of deck 41 relative to base 43.

Figure 14:
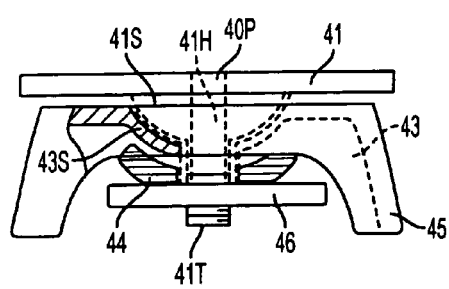
FIG. 14 is a side view of an alternate table assembly.

FIG. 14 shows another embodiment of table assembly 40, where like numerals refer to like parts, and all the teachings of the previous embodiment are wholly incorporated by reference. In this embodiment, feet 45 are not threadingly engaged to base 43 (though persons skilled in the art will recognize that such feet 45 can be provided thereon). In addition, the portion of deck 41 extending through base 43 may have outer threads 41T for threadingly engaging a nut 46. A user can rotate nut 46 to lock the position of deck 41 relative to base 43.

It may be advantageous to provide a spherical cup 44 between a wall defining the spherical cavity 43S and nut 46 to better hold deck 41 relative to base 43.

Figure 15:
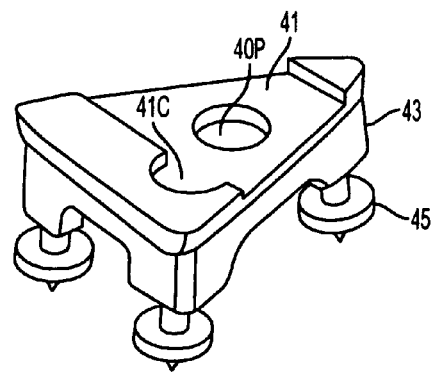
FIG. 15 is a perspective view of another alternate table assembly.

FIG. 15 shows another embodiment of table assembly 40, where like numerals refer to like parts, and all the teachings of the previous embodiments are wholly incorporated by reference. In this embodiment, deck 41 is integrated into base 43. In other words, deck 41 cannot rotate relative to base 43.

Figure 16A:
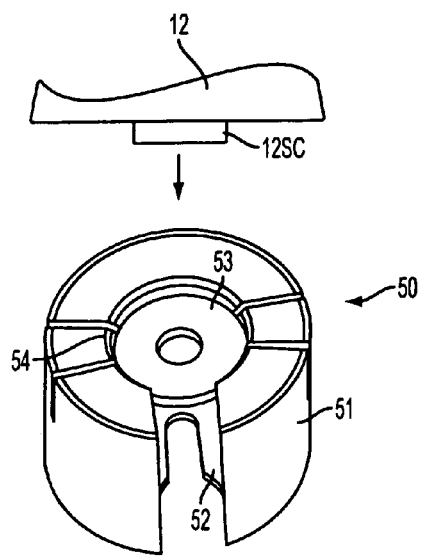
FIGS. 16A–16B show the hanging assembly in assembled and exploded views, respectively.
Figure 16B:
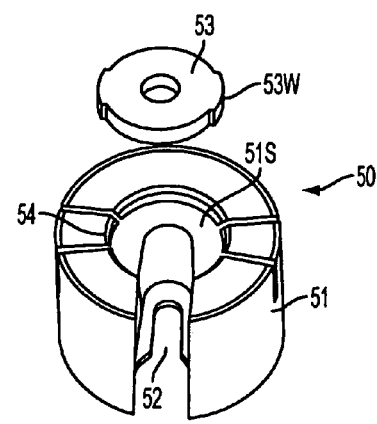

Referring to FIG. 16, a hanging assembly 50 is provided for hanging line generating device 10 from a nail or screw on a wall. Hanging assembly 50 may have a body 51 defining a cut-out 52 for receiving the head of the nail or screw. A washer 53 may be disposed on a shoulder 51S of body 51 and held in place by snap hooks 54. Washer 53 may have wings 53W to better engage the snap hooks 54. Preferably washer 53 is made of a ferromagnetic material.

To assemble such hanging assembly 50, washer 53 just needs to be pushed into body 51. Snap hooks 54 will preferably capture washer 53.

With such arrangement, the user can hang the hanging assembly 50 from a nail or screw, then mount line generating device 10 thereon by inserting protrusion 12SC into body 51. Magnet 12M will preferably magnetically engage washer 53 and keep line generating device 10 on hanging assembly 50.

Figure 17A:
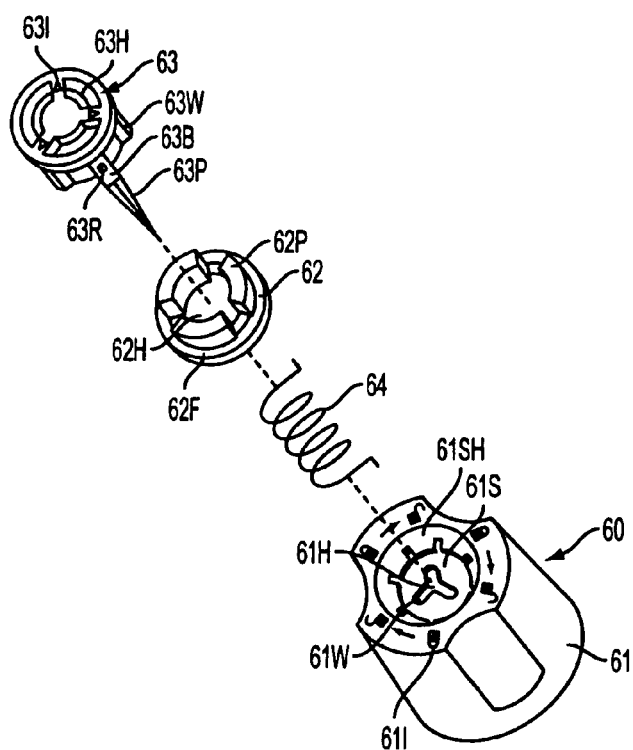
FIGS. 17A–17C show the pin assembly in exploded, uninstalled and installed views, respectively.

It is also preferable to provide a pin assembly 60 for hanging line generating device 10 on a vertical surface without any screws or nail. Referring to FIG. 17, pin assembly 60 may have a body 61 and a washer 62 rotatably captured within body 61 by snap hooks 61SH and shoulder 61S. Washer 62 may have a flange 62F to better engage the snap hooks 61SH. Preferably washer 62 is made of a ferromagnetic material.

Pin assembly 60 may also include a retractable pin assembly 63, which in turn may have pin 63P and a body 63B molded over or attached to pin 63P. Pin 63P and part of body 63B can extend through a hole 62H in washer 62. A torsion spring 64 may be attached to body 63B and body 61 and disposed between washer 62 and body 61 to bias body 63B away from body 61.

Body 63B may have a ramp 63R to capture washer 62. Preferably ramp 63R has a low slope so that an assembler can slip washer 62 unto body 63B past ramp 63R without damaging ramp 63R. On the other hand, if somebody tries to remove washer 62, ramp 63R should prevent such removal.

Preferably pin 63P is movable between a retracted position where pin 63P is covered by body 61 and an extended position where pin 63P extends beyond body 61. It may be desirable to provide a mechanism to prevent unintentional movement of pin 63P from the retracted position to the extended position.

Body 61 may have a hole 61H that allows part of body 63B to extend therethrough when pin 63P is in the extended position. Hole 61W maybe shaped to receive the flanges 63W of body 63B. Spring 64 preferably torsionally rotates body 63B so that flanges 63W are not aligned with hole 61H. Accordingly, the user would need to rotate the body 63B so that flanges 63W are aligned with hole 61H. When flanges 63W and hole 61W are aligned, the user can push the body 63B into body 61, thus moving pin 63P into the extended position.

Figures 17B, 17C:
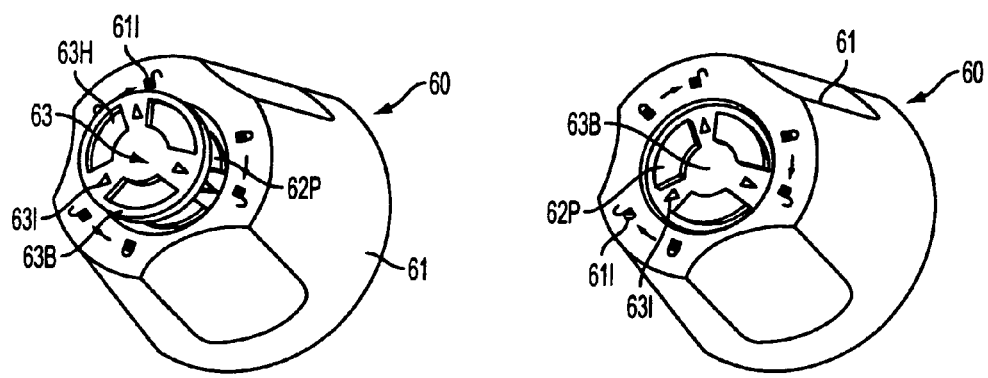

With such arrangement, the user would place pin assembly 60 on a wall, as shown in FIG. 17B. The user would then rotate the body 63B so that flanges 63W are aligned with hole 61H. When flanges 63W and hole 61H are aligned, the user can push the body 63B into body 61, thus moving pin 63P into the extended position and inserting pin 63P in the wall, as shown in FIG. 17C.

Persons skilled in the art will recognize that it is preferable that pin 63P does not have a substantially circular cross-section, so that the pin 63P does not rotate within the hole created in the wall. Instead, it would be preferable for the pin 63P to have a polygonal cross-section, such as a triangle, or at least one flat surface.

It is preferable that the washer 62 has protrusions 62P that extend through holes 63H in body 63B. Accordingly, when the pin 63P is in the extended position, the protrusion 12SC of line generating device can be inserted into body 61 and magnetically engage washer 62.

Indicia 63I and 61I may be provided on bodies 63B and 61, respectively, to indicate the location of protrusions 63W relative to hole 61H, or in other words, the location where user can press body 63B into body 61.

Figure 18:
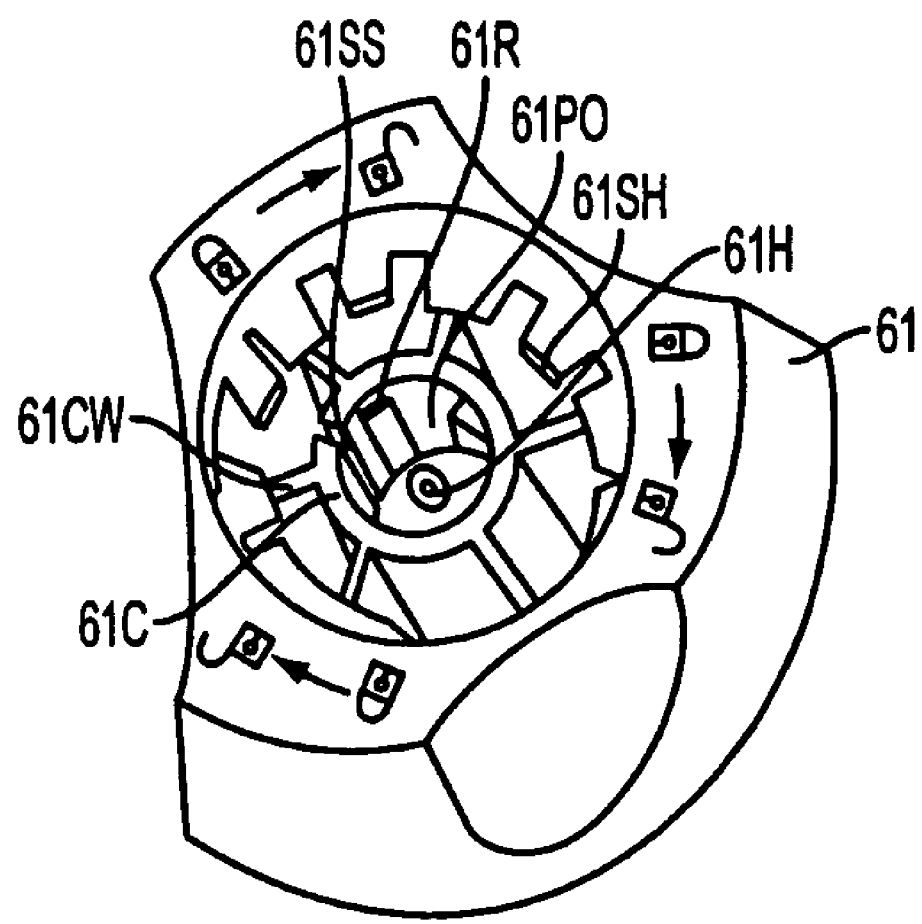
FIG. 18 is a perspective view of a portion of an alternate pin assembly.

FIG. 18 illustrates an alternate body 61, where like numerals refer to like parts. All the teachings of the previous embodiment are hereby incorporated by reference. Body 61 has a cylinder 61C disposed therein. Cylinder 61C has the hole 61H that allows pin 63P to extend therethrough. Walls 61CW extend between the cylinder 61C and body 61 to support cylinder 61C and/or act as a shoulder for washer 62.

Cylinder 61 may have a stop protrusion 61R for each flange 63W, which contacts flanges 63W when pin 63P is in the retracted position. As before, the user may rotate pin 63P until flanges 63W align with channel 61PO between stop protrusions 61R, allowing the user to move pin 63P to the extended position. It may be preferable to provide a ramp 61R between stop protrusion 61R and channel 61PO so that, if the pin 63P is rotated out of engagement with stop protrusion 61R but not far enough to reach channel 61PO, pressure on body 63B will cause rotating of pin 63P towards channel 61PO.

Cylinder 61C may have a slot 61SS for receiving and/or capturing spring 64.

While the invention has been described in this specification and illustrated in the drawings with reference to a preferred embodiment it would be understood by those skilled in the art that various changes may be made and equivalence may be substituted for elements thereof without departing for the scope of the invention as defined in the claims.

What is claimed is:

1. A line generating device comprising:
   a housing;
   a support assembly mounted within the housing;
   a light source mounted on the support assembly such that said light source is fixed relative to said housing;
   a lens mounted on at least one of the support assembly and the light source, the lens receiving light from the light source and projecting the light in the shape of a fan within a plane, the lens generating a bright spot and a line when the light contacts a surface.
   a first level vial mounted on the support assembly, the first level vial having a first longitudinal axis substantially perpendicular to the plane;
   a second level vial mounted on the support assembly, the second level vial having a second longitudinal axis substantially parallel to the plane; and
   a third level vial mounted on the support assembly, the third level vial having a third longitudinal axis substantially parallel to the plane, the third longitudinal axis being substantially perpendicular to the second longitudinal axis.

2. The device of claim 1, further comprising a magnet mounted at least one of the support assembly and the housing.

3. The device of claim 1, wherein the lens has a width smaller than width of the received light.

4. The device of claim 1, wherein the housing has a protrusion, which is axially aligned to the bright spot.

5. The device of claim 1, wherein the support assembly comprises a base mounted underneath the housing.

6. The device of claim 1, wherein the housing comprises a bottom surface, a top surface, a front surface connecting the top and bottom surfaces, a rear surface connecting the top and bottom surfaces, and a side surface connecting the top and bottom surfaces, and the device is disposable on a reference surface on the bottom, rear and side surfaces.

7. A line generating device comprising:
   a housing having a bottom surface, a top surface, a front surface connecting the top and bottom surfaces, a rear surface connecting the top and bottom surfaces, and a side surface connecting the top and bottom surfaces;
   a support assembly mounted within the housing;
   a light source fixedly mounted on the support assembly to prevent relative movement between said light source and said housing; and
   a lens mounted on at least one of the support assembly and the light source, the lens receiving light from the light source and projecting the light in the shape of a fan within a plane, said light exiting through the front surface, the lens generating a bright spot and a line when the light contacts an outside surface,
   wherein the device is disposable on a reference surface on the bottom, rear and side surfaces.

8. The device of claim 7, further comprising:
   a first level vial mounted on the support assembly, the first level vial having a first longitudinal axis substantially perpendicular to the plane;
   a second level vial mounted on the support assembly, the second level vial having a second longitudinal axis substantially parallel to the plane; and
   a third level vial mounted on the support assembly, the third level vial having a third longitudinal axis substantially parallel to the plane, the third longitudinal axis being substantially perpendicular to the second longitudinal axis.

9. A line generating device comprising:
   a housing;
   a support assembly mounted within the housing;
   a light source mounted on the support assembly;
   a lens mounted on at least one of the support assembly and the light source, the lens receiving light from the light source and projecting the projected light in the shape of a fan within a sole plane, so that a line is formed on a reference surface when the light contacts the reference surface, the line having a bright segment at its middle point.

10. The device of claim 9, wherein the lens has a width smaller than width of the received light.

11. A line generating device with a support assembly supporting a level vial comprising:
    a housing;
    a light source disposed within said housing, said light source being adapted to project a line of light in a plane;
    a support portion disposed in said housing, and a lens mounted to the support portion, said lens receiving light from the light source and projecting the light so that it generates a bright spot and a line when the projected light contacts a surface;
    a vial holder;
    a first screw having a first longitudinal axis and extending through the vial holder and threadingly engaging the support portion;

a second screw having a second longitudinal axis and extending through the vial holder and threadingly engaging the support portion, the second longitudinal axis being substantially perpendicular to the first longitudinal axis.

12. The line generating device with a support assembly of claim 11, wherein the level vial is disposed on the vial holder.

13. The line generating device with a support assembly of claim 11, wherein a first spring is disposed between the vial holder and the support portion.

14. The line generating device with a support assembly of claim 13, wherein the first screw extends through the first spring.

15. The line generating device with a support assembly of claim 13, wherein a second spring is disposed between the vial holder and the support portion.

16. The line generating device with a support assembly of claim 15, wherein the second screw extends through the second spring.

* * * * *